United States Patent
Ogawa et al.

(10) Patent No.: US 7,446,496 B2
(45) Date of Patent: Nov. 4, 2008

(54) ABNORMALITY DETECTION SYSTEM OF MOBILE ROBOT

(75) Inventors: Naohide Ogawa, Wako (JP); Yuichiro Kawaguchi, Wako (JP); Masaki Aihara, Wako (JP); Takashi Matsumoto, Wako (JP)

(73) Assignee: Honda Giken Kogyo Kabushiki Kaisha, Minato-Ku, Tokyo (JP)

( * ) Notice: Subject to any disclaimer, the term of this patent is extended or adjusted under 35 U.S.C. 154(b) by 551 days.

(21) Appl. No.: 10/540,488

(22) PCT Filed: Feb. 14, 2003

(86) PCT No.: PCT/JP03/01579

§ 371 (c)(1),
(2), (4) Date: Jun. 23, 2005

(87) PCT Pub. No.: WO2004/071719

PCT Pub. Date: Aug. 26, 2004

(65) Prior Publication Data
US 2006/0055358 A1    Mar. 16, 2006

(51) Int. Cl.
*B25J 19/00*    (2006.01)
*G05B 23/02*    (2006.01)

(52) U.S. Cl. ................................. 318/568.24
(58) Field of Classification Search ............. 318/568.24
See application file for complete search history.

(56) References Cited
U.S. PATENT DOCUMENTS 6,064,167 A * 5/2000 Takenaka et al. ....... 318/568.12
6,584,377 B2 * 6/2003 Saijo et al. ................... 700/245

FOREIGN PATENT DOCUMENTS

| EP | 1103449 A1 | 5/2001 |
|---|---|---|
| JP | 05-241604 | 9/1993 |
| JP | 06-019520 | 1/1994 |
| JP | 06-114766 | 4/1994 |
| JP | 07-219611 | 8/1995 |
| JP | 7-334227 A | 12/1995 |
| JP | 11-048170 | 2/1999 |
| JP | 2001-150374 | 6/2001 |
| JP | 2002-144260 | 5/2002 |

* cited by examiner

Primary Examiner—Lincoln Donovan
Assistant Examiner—Erick Glass
(74) Attorney, Agent, or Firm—Squire, Sanders & Dempsey, L.L.P.

(57) ABSTRACT

In an abnormality detection system of a mobile robot, it is configured such that it is self-diagnosed whether the quantity of state is an abnormal value, or whether at least one of the internal sensor, etc., is abnormal and when an abnormality is self-diagnosed, abnormality information is outputted, then the degree of abnormality is discriminated based on the outputted abnormality information and the robot is driven into a stable state in response to the discriminated degree of abnormality. With this, it becomes possible to effectively utilize the abnormality detection result. In addition, since the robot is driven into a stable state in response to the discriminated degree of abnormality, it becomes possible to render the driving appropriate.

13 Claims, 11 Drawing Sheets

FIG.7

| SUBJECT OF ERROR CHECKING | RANK (DEGREE) OF ERRORS | ACTION PLAN (STABLE STAGE TRANSITION CONTROL) |
|---|---|---|
| MACROSCOPIC STABILIZATION CONTROL | FATAL | CONTROL TO STOP ROBOT IMMEDIATELY |
| ELECTRIC MOTORS | SMALL | INFORM, BUT CONTINUE ROBOT CONTROL |
| | WARNING | CONTINUE CONTROL UNTIL COMPLETION OF WALKING STEP IN PROGRESS |
| | FATAL | CONTROL TO STOP ROBOT IMMEDIATELY |
| INCLINATION SENSOR | FATAL | SWITCH TO SUB-GYRO AND CONTROL TO STOP ROBOT IMMEDIATELY |
| SIX-AXIS FORCE SENSOR, ETC. | FATAL | USE SUBSTITUTE VALUE AND CONTROL TO STOP ROBOT IMMEDIATELY |
| BATTERY, WIRELESS SYSTEM, VOICE AND IMAGE RECOGNITION SYSTEMS | WARNING | CONTINUE CONTROL UNTIL COMPLETION OF WALKING STEP IN PROGRESS |

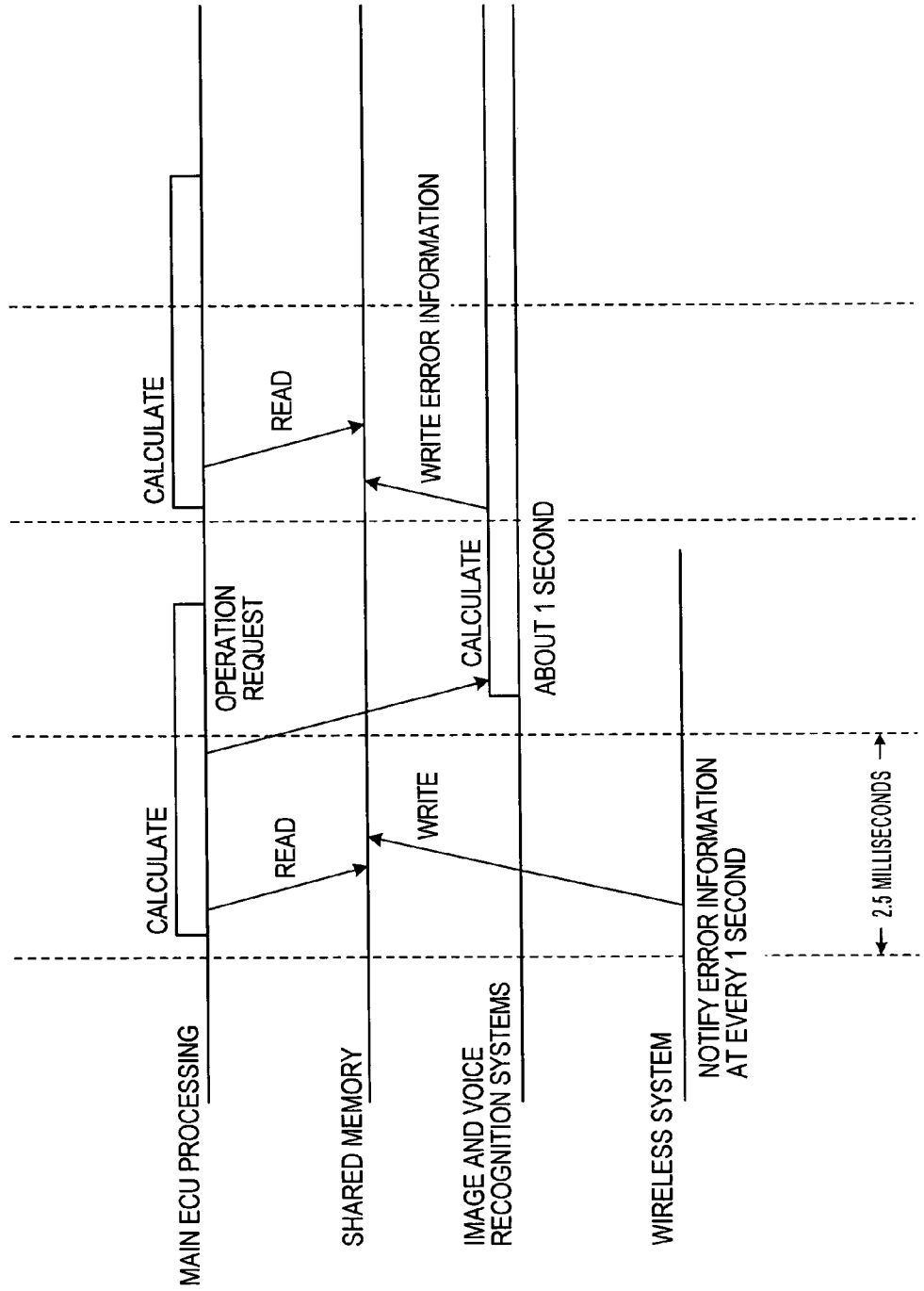

ABNORMALITY DETECTION SYSTEM OF MOBILE ROBOT

TECHNICAL FIELD

This invention relates to an abnormality detection system of a mobile robot.

BACKGROUND ART

As an abnormality detection system of a mobile robot such as a legged mobile robot, there is known the technology taught by Japanese Laid-open Patent Application No. 2001-150374. This system diagnoses itself for abnormalities and informs the user (operator) of the result of the diagnosis by voice via an audio output device and a communications interface, in a natural conversational manner.

However, in the aforesaid prior art, only the diagnosis result is outputted and no measure whatsoever is taken with regard to the point of driving the robot 1 into a stable state when an abnormality occurs.

DISCLOSURE OF THE INVENTION

Therefore, it is an object of this invention to overcome this inconvenience by providing an abnormality detection system of a mobile robot that self-diagnoses whether or not an abnormality occurs and, when an abnormality occurs, discriminates the degree of abnormality and accordingly drives the robot into a stable state, thereby effectively utilizing the abnormality detection result.

In order to solve the aforesaid objects, this invention provides, as recited in claim 1 mentioned below, a system for detecting abnormality of a mobile robot having at least a drive motor, an internal sensor that senses a quantity of state of the internal of the robot and a control unit constituted by an onboard microcomputer that operates the drive motor based on the quantity of state obtained from an output of the internal sensor to move, the control unit comprising: self-diagnosis means for self-diagnosing whether the quantity of state is an abnormal value, or whether at least one of onboard equipments mounted on the robot including at least the drive motor and the internal sensor is abnormal; abnormality information outputting means for outputting, when an abnormality is self-diagnosed by the self-diagnosis means, information of the abnormality; abnormality degree discriminating means for inputting the output of the abnormality information outputting means and for discriminating degree of abnormality based on the abnormality information; and stable state driving means for driving the robot into a stable state in response to the discriminated degree of abnormality. Thus, since it is configured such that it is self-diagnosed whether the quantity of state is an abnormal value, or whether at least one of the internal sensor, etc., is abnormal and when an abnormality is self-diagnosed, abnormality information is outputted, then the degree of abnormality is discriminated based on the outputted abnormality information and the robot is driven into a stable state in response to the discriminated degree of abnormality, it becomes possible to effectively utilize the abnormality detection result. In addition, since the robot is driven into a stable state in response to the discriminated degree of abnormality, it becomes possible to render the driving appropriate. It should be noted that, in this specification, "abnormality" means whole cases other than normal, which are non-normal conditions due to any events including deterioration, failure and damages.

Further, this invention provides, as recited in claim 2 mentioned below, the system in which the stable state driving means drives the robot into a stable state in response to the discriminated degree of abnormality based on a predetermined action plan chart. Thus, since it is configured such that the robot is driven into a stable state in response to the discriminated degree of abnormality based on a predetermined action plan chart, in addition to the effects and advantages mentioned above, it becomes possible to render driving into a stable state more appropriately.

Further, this invention provides, as recited in claim 3 mentioned below, the system further including: abnormality degree storing means for storing the discriminated degree of abnormality in an internal memory provided in the control unit and in an external memory provided outside the robot. Thus, since it is configured such that the discriminated degree of abnormality is stored in an internal memory and in an external memory, in addition to the effects and advantages, it becomes possible to improve the reliability of abnormality detection of the mobile robot.

Further, this invention provides, as recited in claim 4 mentioned below, the system in which the abnormality degree storing means stores the output of the abnormality degree discriminating means and a parameter indicative of the quantity of state of the robot, in an internal memory provided in the control unit and in an external memory provided outside the robot. Thus, since it is configured such that the degree of abnormality and a parameter indicative of the quantity of state of the robot are stored in an internal memory and in an external memory, in addition to the effects and advantages mentioned above, it becomes possible to ascertain accurately the course of events leading up to the abnormality, thereby enabling to further improve the reliability of abnormality detection of the mobile robot. Further, it becomes possible to drive the robot into a stable state by taking the quantity of state into account, thereby enabling to render driving into a stable state more appropriately.

Further, this invention provides, as recited in claim 5 mentioned below, the system in which the control unit includes: dynamic model behavior correcting means for inputting at least a desired manipulated variable, and based on a dynamic model which outputs a desired behavior of the robot, that is a plant, such that the desired manipulated variable is satisfied, correcting the behavior of the dynamic model, by additionally inputting a correction amount of the desired manipulated variable determined in response to an error in the quantities of state of the dynamic model and the robot to at least the dynamic model; and control means for controlling operation of the drive motor so as to follow the behavior of the dynamic model; and the self-diagnosis means self-diagnoses that the quantity of state is an abnormal value when the error in the quantities of state of the dynamic model and the robot is not within a predetermined value. Thus, when conducting the aforesaid control, since it is configured such that the quantity of state is self-diagnosed to be an abnormal value when the error in the quantities of state of the dynamic model and the robot exceeds a predetermined value, in addition to the effects and advantages mentioned above, it becomes possible to detect the abnormality of the quantity of state accurately, thereby enabling to improve the reliability of abnormality detection of the mobile robot, and enabling to render the driving into a stable state more appropriately.

Further, this invention provides, as recited in claim 6 mentioned below, the system in which the robot has a body and a plurality of leg linkages each swingably connected to the body through a joint and each connected with a foot at its distal end through a joint, the internal sensor includes an inclination sensor that generates an output indicative of an inclination of the body of the robot relative to a vertical axis, and the self-diagnosis means self-diagnoses that the inclination sensor is abnormal when the output of the inclination sensor is not within a predetermined range. With this, in addition to the effects and advantages mentioned above, it becomes possible to detect the abnormality of the inclination sensor as the internal sensor accurately, thereby enabling to improve the reliability of abnormality detection of the mobile robot, and enabling to render the driving into a stable state more appropriately., thereby enabling to render the driving into a stable state more appropriately.

Further, this invention provides, as recited in claim 7 mentioned below, the system in which the robot has a body and a plurality of leg linkages each swingably connected to the body through a joint and each connected with a foot at its distal end through a joint; the internal sensor includes an angle detector that generates an output indicative of at least one of an angle, angular velocity and angular acceleration of the joints, and the self-diagnosis means self-diagnoses that the angle detector is abnormal when the output of the angle detector is not within a predetermined range. With this, in addition to the effects and advantages mentioned above, it becomes possible to detect the abnormality of the angle detector as the internal sensor accurately, thereby enabling to improve the reliability of abnormality detection of the mobile robot, and enabling to render the driving into a stable state more appropriately.

Further, this invention provides, as recited in claim 8 mentioned below, the system in which the onboard equipments include an external sensor that generates an output indicative of taken images. With this, in addition to the effects and advantages mentioned above, when the external sensor is installed as the onboard equipments, it becomes possible to detect the abnormality of the sensor accurately, thereby enabling to improve the reliability of abnormality detection of the mobile robot, and enabling to render the driving into a stable state more appropriately.

Further, this invention provides, as recited in claim 9 mentioned below, the system in which the onboard equipments include a floor reaction force detector that detects a floor reaction force acting on the robot, and the self-diagnosis means self-diagnoses that the floor reaction force detector is abnormal when the output of the floor reaction force detector is not within a predetermined range. With this, in addition to the effects and advantages mentioned above, when the floor reaction force detector is installed as the onboard equipments, it becomes possible to detect the abnormality of the detector accurately, thereby enabling to improve the reliability of abnormality detection of the mobile robot, and enabling to render the driving into a stable state more appropriately.

Further, this invention provides, as recited in claim 10 mentioned below, the system in which the onboard equipments include sensors that detect a current supplied to the drive motor and a temperature of the drive motor, and the self-diagnosis means self-diagnoses that the drive motor is abnormal when at least one of the detected current and temperature is not within a corresponding one of predetermined ranges set respectively with respect to the current and temperature. With this, in addition to the effects and advantages mentioned above, it becomes possible to detect the abnormality of the drive motor accurately, thereby enabling to improve the reliability of abnormality detection of the mobile robot, and enabling to render the driving into a stable state more appropriately.

Further, this invention provides, as recited in claim 11 mentioned below, the system in which the onboard equipments include a battery that supplies a current to the control unit and the drive motor and a voltage sensor that generates an output indicative of a voltage of the battery, and the self-diagnosis means self-diagnoses that the battery is abnormal when the output of the voltage sensor is smaller than a predetermined value. With this, in addition to the effects and advantages mentioned above, it becomes possible to detect the abnormality of the battery accurately, thereby enabling to improve the reliability of abnormality detection of the mobile robot, and enabling to render the driving into a stable state more appropriately. It should be noted here that the "abnormality of the battery" is based on the premise that the battery is regarded as normal if its output voltage is within a predetermined range.

Further, this invention provides, as recited in claim 12 mentioned below, the system in which the onboard equipments include a voice recognition system that enables voice communication with an operator. With this, in addition to the effects and advantages mentioned above, when the voice recognition system is installed as the onboard equipments, it becomes possible to detect the abnormality of the voice recognition system, thereby enabling to improve the reliability of abnormality detection of the mobile robot, and enabling to render the driving into a stable state more appropriately.

Further, this invention provides, as recited in claim 13 mentioned below, the system further including: an operator's operation control unit provided outside the robot and comprising a microcomputer that includes the external memory; and communication means connecting the control unit and the operator's operation control unit for establishing communication therebetween; and the self-diagnosis means self-diagnoses whether the communication means is abnormal. With this, when the communication system is installed, it becomes possible to detect the abnormality thereof, thereby enabling to improve the reliability of abnormality detection of the mobile robot, and enabling to render the driving into a stable state more appropriately.

BRIEF EXPLANATION OF THE DRAWINGS

FIG. 7 is an explanatory diagram showing an action plan chart used in the flowchart of FIG. 6.

FIG. 12 is time chart for explaining the processing operations of the flowcharts of FIGS. 10 and 11.

BEST MODE OF CARRYING OUT THE INVENTION

An abnormality detection system of a mobile robot according to an embodiment of this invention will be explained with reference to the attached drawings in the following.

Figure 1:
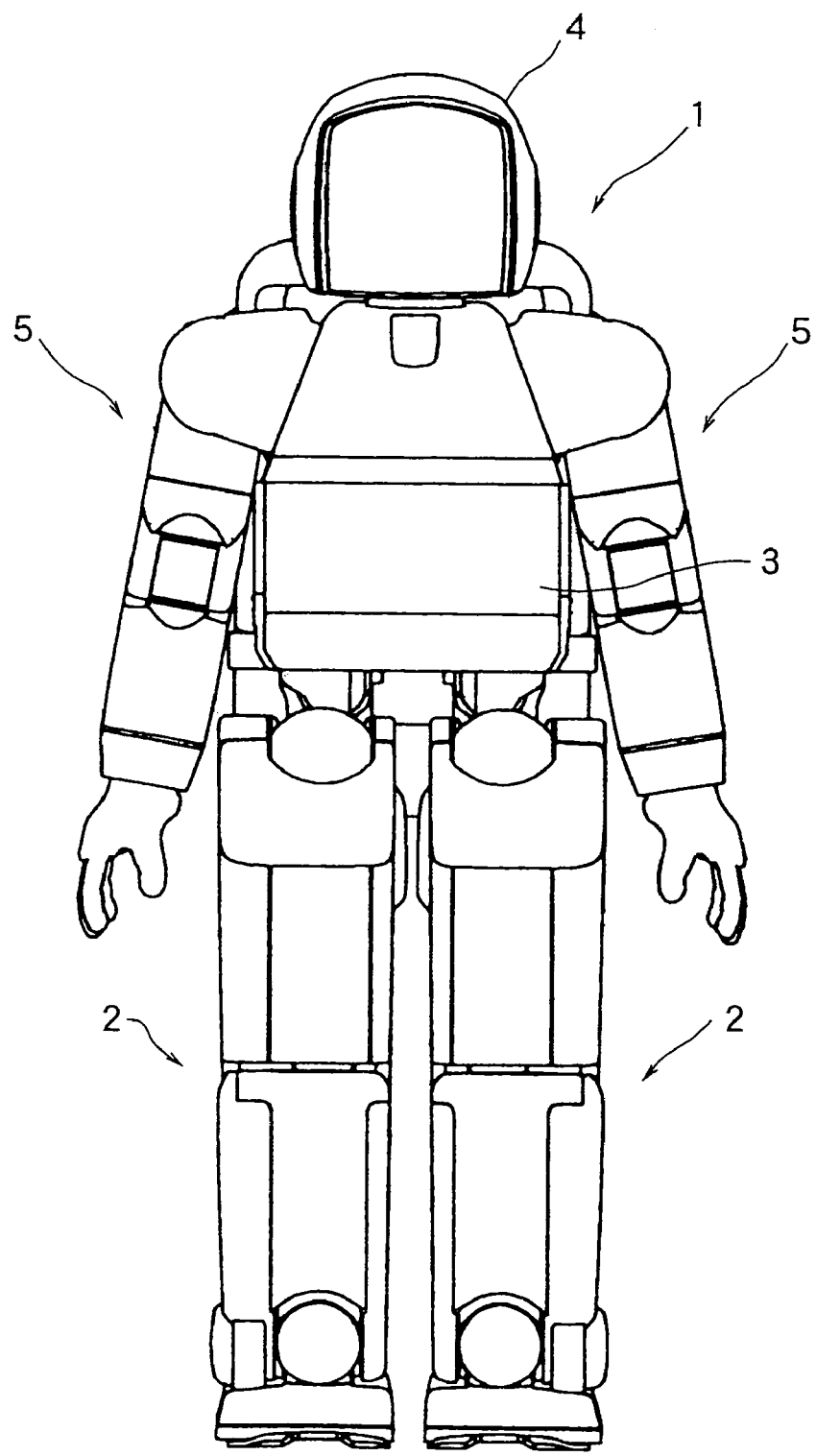
FIG. 1 is a front view of a mobile robot, specifically a legged mobile robot, to which an abnormality detection system of a mobile robot according to an embodiment of this invention applies.
Figure 2:
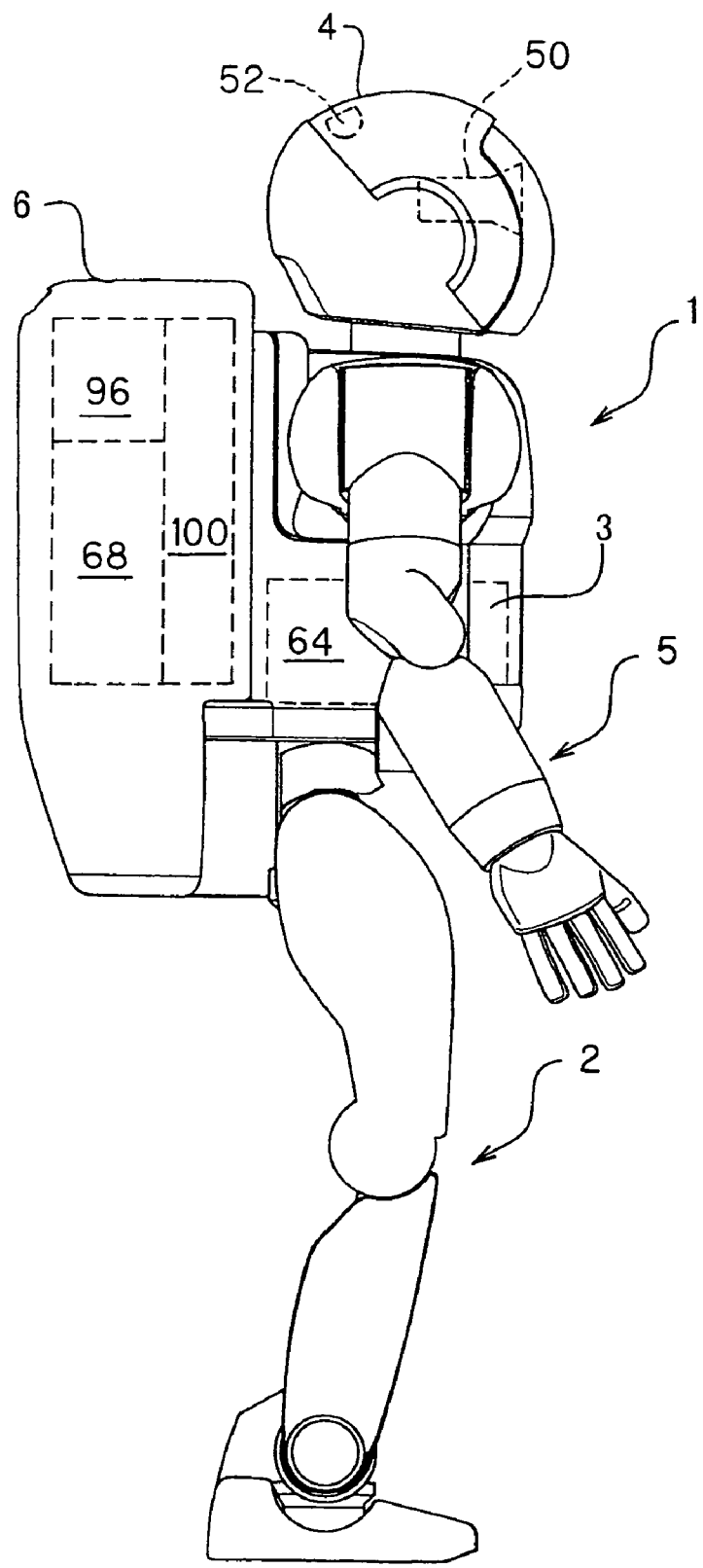
FIG. 2 is a side view of the robot shown in FIG. 1.

FIG. 1 is a front view of a mobile robot, specifically a legged mobile robot, to which an abnormality detection system of a mobile robot according to an embodiment of this invention applies, and FIG. 2 is a side view thereof. A biped humanoid robot is taken here as an example of a legged mobile robot.

As shown in FIG. 1, the legged mobile robot (hereinafter called simply "robot") 1 is equipped with a plurality of, more specifically two leg linkages 2 and a body (main unit) 3 above the leg linkages 2. A head 4 is formed above the body 3 and two arm linkages 5 are connected one to either side of the body 3. As shown in FIG. 2, a housing unit 6 is mounted on the back of the body 3 for accommodating therein, inter alia, a control unit (explained later). The robot 1 shown in FIGS. 1 and 2 is equipped with covers for protecting its internal structures.

Figure 3:
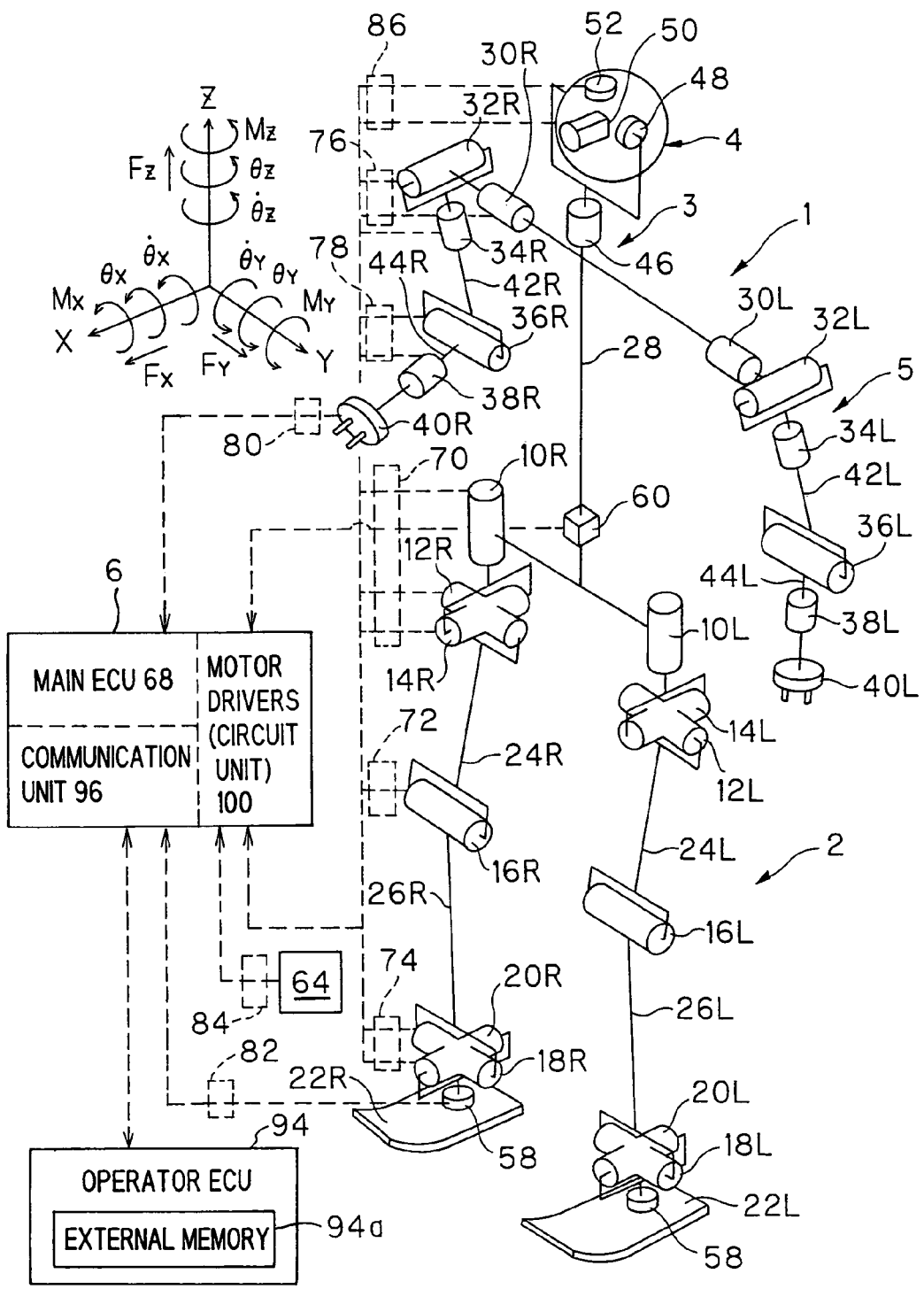
FIG. 3 is an explanatory diagram showing a skeletonized view of the robot of FIG. 1.

FIG. 3 is an explanatory diagram showing a skeletonized view of the robot 1. The internal structures of the robot 1 will be explained with reference to this drawing, with primary focus on the joints. As illustrated, the leg linkages 2 and arm linkages 5 on either the left or right of the robot 1 are equipped with six joints driven by 11 electric motors (drive motors).

Specifically, the robot 1 is equipped at its hips (crotch) with electric motors (drive motors) 10R, 10L (R and L indicating the right and left sides; hereinafter the same) constituting joints for swinging or swiveling the leg linkages 2 around a vertical axis (the Z axis or vertical axis), electric motors 12R, 12L constituting joints for driving (swinging) the leg linkages 2 in the pitch (advance) direction (around the Y axis), and 14R, 14L constituting joints for driving the leg linkages 2 in the roll (lateral) direction (around the X axis), is equipped at its knees with electric motors 16R, 16L constituting knee joints for driving the lower portions of the leg linkages 2 in the pitch direction (around the Y axis), and is equipped at its ankles with electric motors 18R, 18L constituting foot (ankle) joints for driving the distal ends of the leg linkages 2 in the pitch direction (around the Y axis) and electric motors 20R, 20L constituting foot (ankle) joints for driving them in the roll direction (around the X axis).

As set out in the foregoing, the joints are indicated in FIG. 3 by the axes of rotation of the electric motors constituting (located at) the joints (or the axes of rotation of transmitting elements (pulleys, etc.)) for transmitting the power of the electric motors. Feet 22R, 22L are attached to the distal ends of the leg linkages 2.

In this manner, the electric motors 10R(L), 12R(L) and 14R(L) are disposed at the crotch joints (hip joints) of the leg linkages 2 with their axes of rotation oriented orthogonally, and the electric motors 18R(L) and 20R(L) are disposed at the foot joints (ankle joints) with their axes of rotation oriented orthogonally. The crotch joints and knee joints are connected by thigh links 24R(L) and the knee joints and foot joints are connected by shank links 26R(L).

The leg linkages 2 are connected through the crotch joints to the body 3, which is represented in FIG. 3 simply by a body link 28. The arm linkages 5 are connected to the body 3, as set out above.

The arm linkages 5 are configured similarly to the leg linkages 2. Specifically, the robot 1 is equipped at its shoulders with electric motors 30R, 30L constituting joints for driving the arm linkages 5 in the pitch direction and electric motors 32R, 32L constituting joints for driving them in the roll direction, is equipped with electric motors 34R, 34L constituting joints for swiveling the free ends of the arm linkages 5, is equipped at its elbows with electric motors 36R, 36L constituting joints for swiveling parts distal thereof, and is equipped at the distal ends of the arm linkages 5 with electric motors 38R, 38L constituting wrist joints for swiveling the distal ends. Hands (end effectors) 40R, 40L are attached to the distal ends of the wrists.

In other words, the electric motors 30R(L), 32R(L) and 34R(L) are disposed at the shoulder joints of the arm linkages 5 with their axes of rotation oriented orthogonally. The shoulder joints and elbow joints are connected by upper arm links 42R(L) and the elbow joints and wrist joints are connected by forearm links 44R(L).

The head 4 is connected to the body 3 through a neck joint 46 around a vertical axis and a head nod mechanism 48 for rotating the head 4 around an axis perpendicular thereto. As shown in FIG. 3 (and FIG. 2), the interior of the head 4 has mounted therein a vision sensor (external sensor) 50 constituted as a CCD camera for taking and generating an output indicative of images, and a voice input/output device 52 comprising a receiver and a microphone.

Owing to the foregoing configuration, the leg linkages 2 are each provided with 6 joints constituted of a total of 12 degrees of freedom for the left and right legs, so that during locomotion the legs as a whole can be imparted with desired movements by driving the six joints to appropriate angles to enable desired walking in three-dimensional space. Further, the arm linkages 5 are each provided with 6 joints constituted of a total of 10 degrees of freedom for the left and right arms, so that desired tasks can be carried out by driving these 6 joints to appropriate angles. In addition, the head 4 is provided with a joint and the head nod mechanism constituted of two 2 degrees of freedom, so that the head 4 can be faced in a desired direction by driving these to appropriate angles.

Each of the electric motors 10R(L) and the like is provided with a rotary encoder serving as an internal sensor (angle detector; designated solely by 56 in FIG. 4) that generates a signal corresponding to at least one among the angle, angular velocity and angular acceleration of the associated joint produced by the rotation of the rotary shaft of the electric motor.

A conventional six-axis force sensor (floor reaction force detector; external sensor) 58 is attached to each foot member 22R(L), generates signals representing, of the external forces acting on the robot, the floor reaction force components Fx, Fy and Fz of three directions and the moment components Mx, My and Mz of three directions acting on the robot from the surface of contact.

In addition, an inclination sensor (posture sensor) 60 installed on the body 3 as an internal sensor generates a signal representing at least one of the inclination (tilt angle) relative to the vertical axis and the angular velocity thereof, i.e., representing at least one quantity of state such as the inclination (posture) of the body 3 of the robot 1. The inclination sensor 60 is equipped with a main gyro and a sub-gyro installed separately of the main gyro in association therewith as a backup used when the main gyro malfunctions.

As shown in FIG. 2, the body 3 of the robot 1 accommodates a battery 64 at its lower region and a main control unit constituted as a microcomputer (hereinafter called the "main ECU 68") at a housing unit 6 provided on its back.

Distributed control units 70, 72, 74, 76, 78 and 80, also constituted as microcomputers (hereinafter called "distributed ECUs"), are installed near the aforesaid crotch joints, knee joints, foot joints, shoulder joints, elbow joints and wrist joints.

In addition, distributed ECUs 82 and 84 are installed near and in association with the six-axis force sensors 58 and battery 64, while a distributed ECU 86 is installed at an appropriate location in association with the devices in the head 4. The distributed ECU 86 receives the image signals generated by the vision sensor 50 and, together with the vision sensor 50, constitutes an image recognition system for recognizing the environment or ambience of the robot 1 through images.

The input and output of the voice input/output device 52 are also connected to the distributed ECU 86. The distributed ECU 86 recognizes voice instructions of the operator coming in via the receiver and sends its voice output to the operator via the microphone, whereby, together with the voice input/output device 52, it constitutes a voice recognition system capable of voice communication.

The robot 1 is thus equipped with 16 distributed ECUs. The battery 64, which is capable of supplying direct current of 40[V], serves not only as an operating power source for the group of distributed ECUs but also as an operating power source for the electric motors 10R(L) and the like and the main ECU 68 and the like. A voltage sensor 90 (shown in FIG. 4) installed at an appropriate point in the current supply circuit of the battery 64 generates a signal representing the output voltage of the battery 64.

As shown at the lower part of FIG. 3, an operator's operation control unit (hereinafter called an "operator ECU") 94 constituted as a microcomputer is provided outside the robot 1 independently of the main ECU 68. A communication unit 96 is installed in the housing unit 6 for establishing wireless communication between the main ECU 68 and the operator ECU 94, thereby constituting a wireless system. The operator ECU 94 is equipped with an indicator (not shown).

Figure 4:
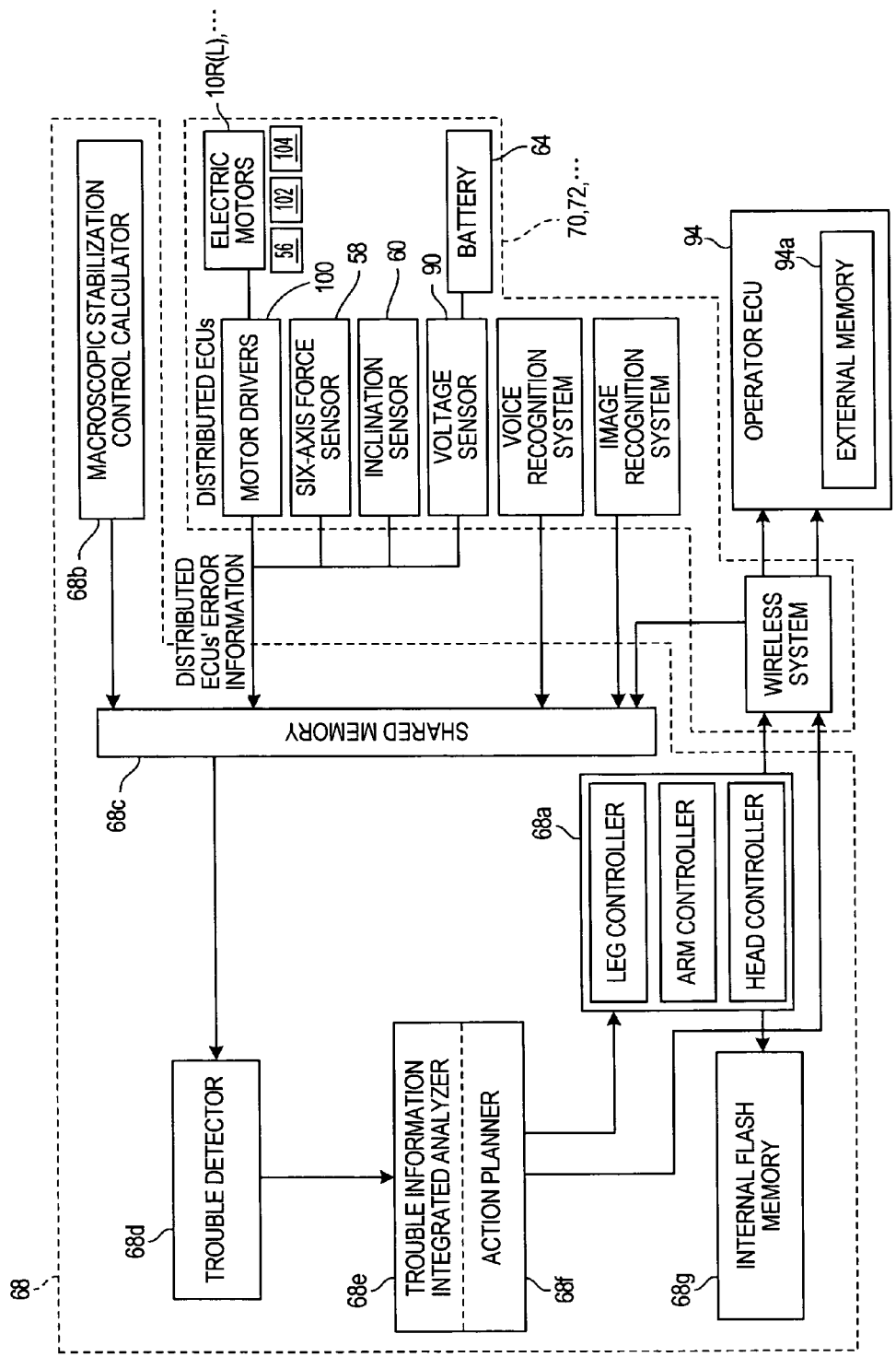
FIG. 4 is a block diagram showing the structural details of a control unit and the like shown in FIG. 3.

FIG. 4 is a block diagram functionally illustrating the configuration of the main ECU 68, etc. The configuration of the main ECU 68 and the like will be explained in greater detail with reference to this drawing. The main ECU 68 is equipped with a controller 68a, a macroscopic (or general) stabilization control calculator 68b and a shared memory 68c, etc. The outputs of the rotary encoders 56, six-axis force sensors 58, inclination sensor 60, voltage sensor 90 and so forth are inputted to the main ECU 68 and then stored in the shared memory 68c.

The controller 68a is equipped with a leg controller, arm controller and head controller. The leg controller operates the individual electric motors (drive motors) 10R(L) and the like through a group of motor drivers 100 and effect controlling for driving the leg linkages 2 and causing locomotion, based on gait parameters generated beforehand, the outputs of the inclination sensor 60 and the like representing quantities of state of the robot 1 stored in the shared memory 68c and the output of the external sensor comprising the six-axis force sensors 58. As shown in FIGS. 2 and 3, a group of motor drivers 100 are accommodated in the housing unit 6 as a circuit unit.

Figure 5:
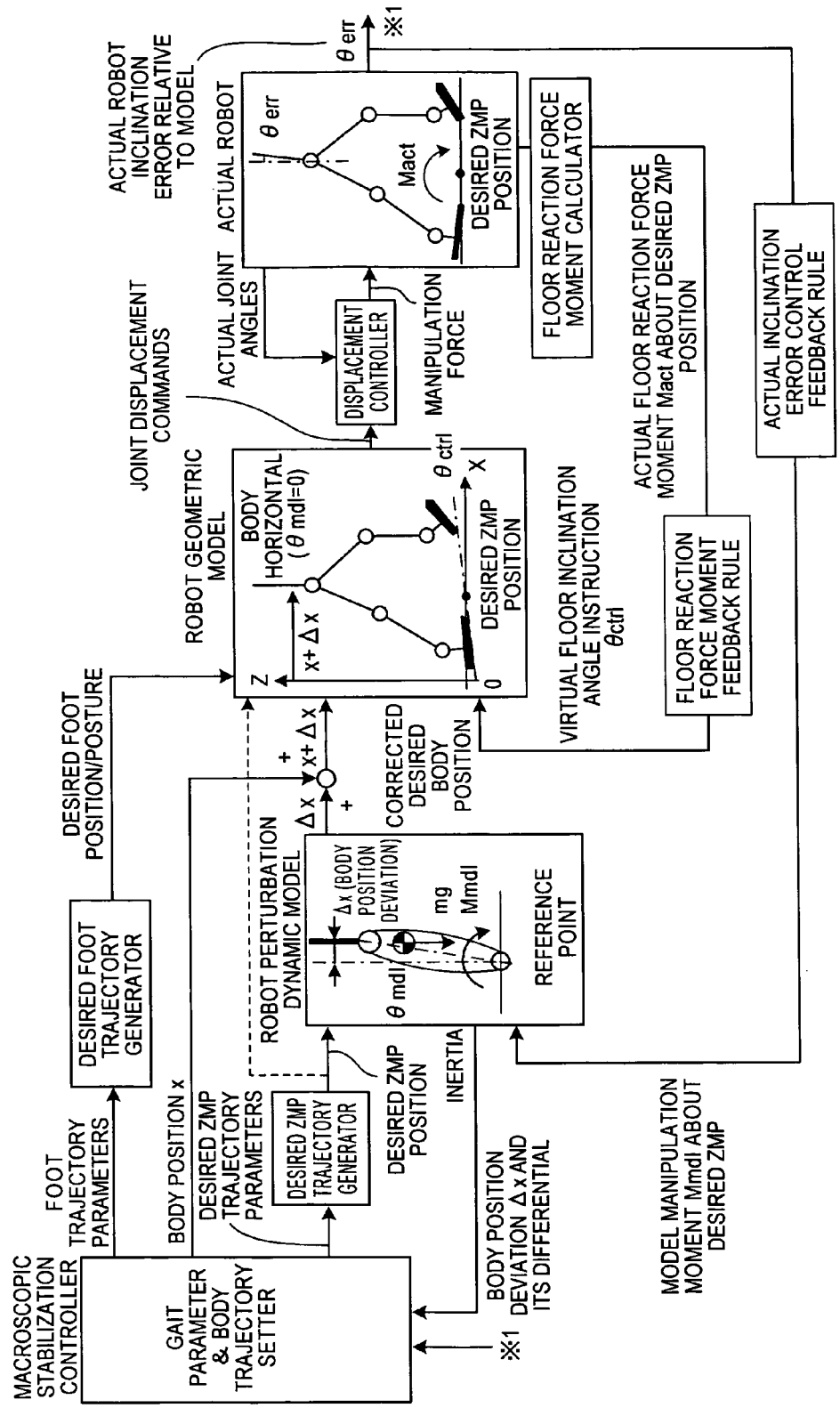
FIG. 5 is a block diagram for explaining the operation of a general stabilization control calculator shown in FIG. 4.

FIG. 5 is a block diagram for explaining the operations of the macroscopic stabilization control calculator 68b that are discussed later. As illustrated, the gait parameters include motion parameters comprising the positions and postures (orientations) of the body 3 and feet 22, and floor reaction force parameters defined by ZMP (Zero Moment Point). "Position" is designated in an X, Y, Z coordinate system and "posture" is designated by angle relative to the X, Y and Z axes. "Inclination" is therefore one constituent of the parameter of the posture.

The gait is made up of the motion trajectory (locus) and the floor reaction force trajectory (locus) during one walking step (from the start of the two-leg support period to the terminal or end of the one-leg support period). A series of walking amounts to a continuous series of gaits in a single walking step.

Moreover, the arm controller of the controller 68a controls the driving of the arm linkages 5 in accordance with the nature of the task and the head controller controls the driving of the head nod mechanism 48 in accordance with the instructions of the image recognition system.

The macroscopic stabilization control calculator 68b is equipped with dynamic model behavior correction means (actual inclination error control feedback rule) that, as shown in FIG. 5, based on the outputs of the inclination sensor 60 and the like representing quantities of state of the robot 1 stored in the shared memory 68c and the outputs of the external sensors constituted by the six-axis force sensors 58, inputs at least a desired manipulated variable (a moment, more specifically, a model manipulation moment Mmd1 about a desired ZMP) and using a dynamic model (robot perturbation dynamic model) which outputs a desired behavior of the robot (plant) 1 such that the desired manipulated variable is satisfied, corrects the behavior of the dynamic model, by additionally inputting a correction amount of the desired manipulated variable (model manipulated moment Mmd1) determined in response to at least the dynamic model and the quantity of state of the robot 1, specifically the error $\theta$err of the inclination (inclination angle) of the body 3 relative to the vertical axis measured via the inclination sensor 60, to at least the dynamic model, control means that controls the operation of the electric motors (drive motors) 10R(L) and the like, specifically joint displacement control means (displacement controller) that drives the electric motors 10R(L) and the like to control joint displacement to follow the behavior of dynamic model. Since the details of the macroscopic stabilization control calculator 68b is described in Japanese Laid-Open Patent Application No. Hei 5(1993)-337849, filed by the applicant, further explanation will be omitted.

The operator ECU 94 is equipped with a memory 94a that functions as an external memory. The energizing circuits of the electric motors 10R(L) and the like are equipped with current sensors 102 that generate signals representing the energizing current supplied to the electric motors, and temperature sensors 104, provided at appropriate locations on the electric motors, generate signals representing the temperatures thereof.

Figure 6:
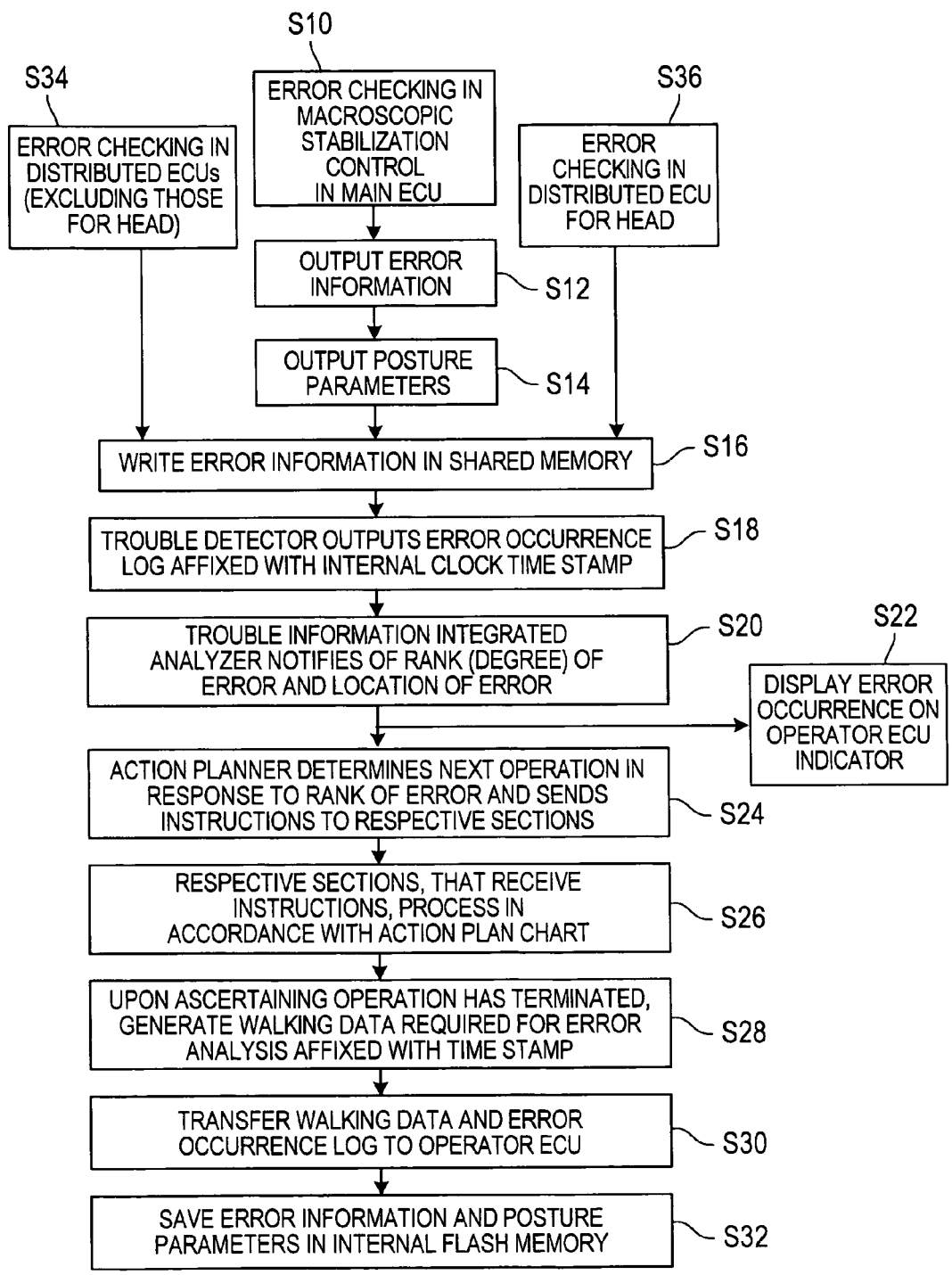
FIG. 6 is a flowchart of the operations of the abnormality detection system of a mobile robot shown in FIG. 3.

Next, the abnormality detection (error checking) that is a characteristic feature of this invention will be explained with reference to the flowchart of FIG. 6. The program indicated by the flowchart of FIG. 6 is executed once every 2.5 msec.

First, in S10, the macroscopic stabilization control calculator 68b of the main ECU 68 conducts an error checking (abnormality detection (self-diagnosis)) by discriminating whether the quantities of state, i.e., the errors or deviations (inclination error) $\theta$err of the inclination angle of the robot 1 relative to the dynamic model, specifically the error $\theta$errx in the X-axis direction and the error $\theta$erry in the Y-axis direction, exceed predetermined angles (e.g., 20 degrees).

When the errors are respectively found to be within the predetermined ranges, the general stabilization control calculator 68b discriminates that the quantities of state are normal, and when the errors in either the X-axis direction or Y-axis direction is not within the predetermined range, it discriminates that the quantity of state is abnormal, whereafter, in S12, it outputs error information (abnormality information), i.e., error information to the effect that the errors $\theta$errx or error $\theta$erry is too large, and then, in S14, it outputs the posture parameters at that time. The posture parameters include not only the aforesaid position/posture parameters of the body 3 and the like but also the error θerr and the time since the robot 1 was activated.

Next, in S16, the macroscopic stabilization control calculator 68b writes the error information in the shared memory 68c. As shown in FIG. 4, the error information is also sent to a trouble detector 68d.

Then, in S18, the trouble detector 68d outputs an error occurrence log (record) affixed with an internal clock time stamp, i.e., it outputs the error information (abnormality information) affixed with the time of abnormality occurrence. The output of the trouble detector 68d is sent to a trouble information integrated analyzer 68e.

Then, in S20, the trouble information integrated analyzer 68e notifies an action planner 68f of the rank (degree) of error, i.e., it discriminates the rank (degree) of the error (abnormality) based on the error information to produce an output indicative of the discrimination result and where it has been generated (in the case under discussion, in the macroscopic stabilization control calculator 68b). Then, in S22, the output is sent via the wireless system to the operator ECU 94 to be displayed on the indicator thereof so as to inform the operator that an error (abnormality) has been detected.

Then, in S24, the action planner 68f determines the next operation (action) in response to the degree of error and sends instructions to the respective sections (the controller 68a and the like), such that control is conducted in response to the discriminated degree to drive the robot 1 into a stable state. Specifically, based on a predetermined action plan chart, it sends stable state transition control instructions such as for stopping locomotion in response to the discriminated degree such that the state of the robot 1 transits to a stable state. Then, in S26, the respective sections that receive the instructions (the controller 68a and the like) perform the control in accordance with the action plan chart.

FIG. 7 is an explanatory diagram showing the action plan chart. As shown, the rank (degree) of the error occurred in the macroscopic stabilization control is determined to be FATAL, in this case the controller 68a is instructed to stop the robot 1 immediately. The ranks (degrees) comprise the following:

FATAL . . . it means that the degree of error (abnormality) is of a high level. In this case, therefore, control is effected for immediately stopping the robot.

WARNING . . . it means that the degree of error (abnormality) is of a medium level. In this case, therefore, the robot is not stopped immediately but control is continued for one walking step, i.e., until completion of the walking step in progress, whereafter stable state transition control is conducted to stop the robot.

SMALL . . . it means that the degree of error (abnormality) is of a low level. In this case, therefore, only a measure such as informing the operator is taken and no robot stopping control is performed.

The explanation of the flowchart of FIG. 6 will be continued. Next, in S28, upon ascertaining that operation of the robot 1 has terminated, in this case upon confirming that the robot 1 stopped immediately, the action planner 68f generates walking or locomotion data required for error analysis (specifically, the aforesaid motion parameters, floor reaction force parameters and so forth) and affixes a time stamp thereto.

Next, in S30, the walking data and error log (record) are transferred to the operator ECU 94 via the wireless system and saved (stored) in the memory (external memory) 94a thereof. Then, in S32, the error information (abnormality information) and the posture parameters are saved (stored) in an internal flash memory (internal memory) 68g.

The foregoing is the abnormality detection of the macroscopic stabilization control conducted by the main ECU 68. Next there will be explained error checking (abnormality detection) of from the distributed ECU 70 to the distributed ECU 84 (the ECU 86 for the head being excluded), which is conducted in S34.

Figure 8:
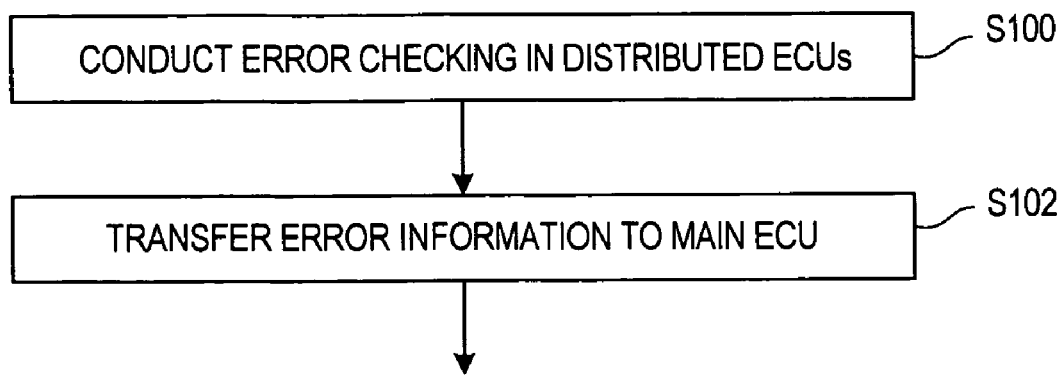
FIG. 8 is a flowchart showing a subroutine of the flowchart of FIG. 6.

FIG. 8 is a subroutine flowchart showing the error check of S34.

In S100, an error checking (abnormality detection) is conducted by discriminating, inter alia, whether the outputs in the 15 distributed ECUs 70 to 84 are within predetermined ranges. Specifically, presence/absence of error is checked (self-diagnosed) by discriminating whether the outputs of the electric motors 10R(L) and the like, the internal sensors, i.e., the rotary encoders 56 and inclination sensor 60, and of the six-axis force sensors (external sensors) 58 are within predetermined ranges.

More specifically, with regard to the electric motors 10R(L) and the like, discrimination is made as to whether the energizing currents and temperatures detected from the outputs of the current sensors 102 and temperature sensors 104 as set out above are within the respective predetermined ranges defined therefor, and when any of the detected energizing currents and temperatures is not within the corresponding range, error is discriminated.

With regard to the rotary encoders 56 and inclination sensor 60, discrimination is made as to whether the values (inclination angle) detected from the outputs (output of the main gyro in the case of the inclination sensor 60) are within predetermined ranges, and when any of the outputs is not within the corresponding range, error is discriminated (self-diagnosed). Error detection with regard to the inclination sensor 60 is performed by the distributed ECU 70, for example.

With regard to the distributed ECU 82 for the six-axis force sensors, discrimination is similarly made as to whether the outputs of the six-axis force sensors 58 are within predetermined ranges, and when any of the outputs is not within the corresponding ranges, error is discriminated (self-diagnosed).

With regard to the distributed ECU 84 for the battery, the output voltage of the battery 64 detected from the output of the voltage sensor 90 is compared with a predetermined value and it is discriminated (self-diagnosed) that error has occurred in the battery 64 when the output voltage is smaller than the predetermined value.

Figure 9:
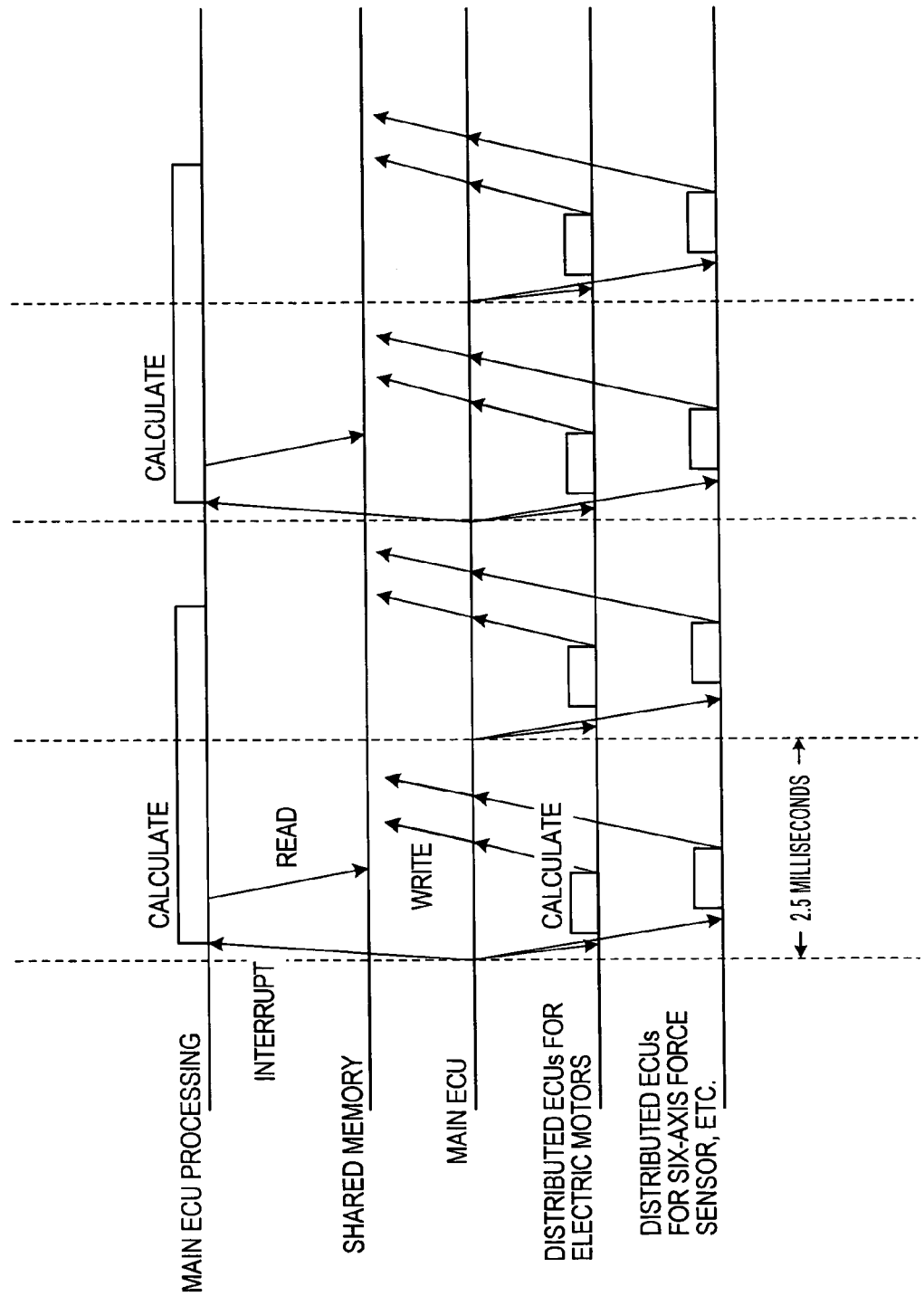
FIG. 9 is a time chart for explaining the processing operations of the flowchart of FIG. 8.

When error is discriminated, the error information is transferred to the main ECU 68 in S102. FIG. 9 is a time chart of these processing operations.

The error checking with regard to the distributed ECU 86 for the head which is conducted in S36, will be explained next.

Figure 10:
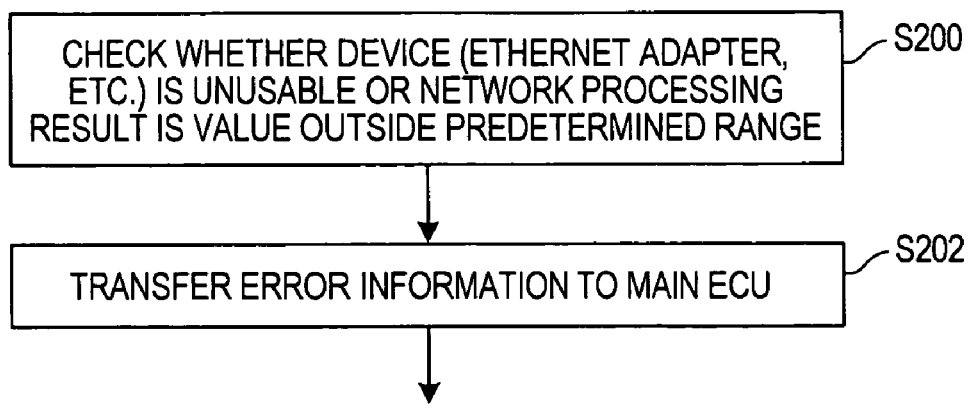
FIG. 10 is a flowchart showing a subroutine of the flowchart of FIG. 6.

FIG. 10 is a subroutine flowchart showing error checking of the wireless system therein.

In S200, it is checked (self-diagnosed) whether a wireless system device (Ethernet (registered trademark) adapter or the like) is unusable or whether the network processing result is a value outside a predetermined range (or whether the network processing result is detecting a value outside the predetermined range), and when the result is affirmative, error information is transferred to the main ECU 68 in S202.

Figure 11:
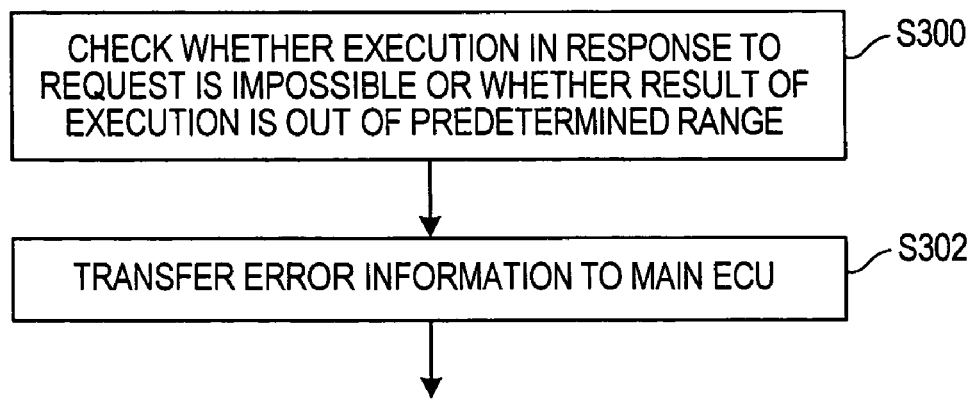
FIG. 11 is a flowchart showing a subroutine of the flowchart of FIG. 6.

FIG. 11 is a subroutine flowchart showing the error checking of the image recognition and voice recognition systems therein.

In S300, it is checked (self-diagnosed) whether execution in response to a request is impossible or whether the result of execution is out of a predetermined range, and when the result is affirmative, error information is transferred to the main ECU 68 in S302. FIG. 12 is a time chart of the processing of the wireless system and image/voice recognition systems.

The explanation of the flowchart of FIG. 6 will be resumed. When error information is transmitted from the distributed ECUs, the main ECU 68 writes the error information to the shared memory 68c in S16, outputs the error occurrence log affixed with a time stamp in S18, and carries out the processing operations set out above in S20 and onwards.

The processing operations of the action planner in S24 in the case where the error information is outputted from the distributed ECUs will be explained with reference to FIG. 7. In such case, when abnormality of the electric motors 10R(L) and the like is discriminated, the degree (rank) of the abnormality is, as set out above, discriminated among FATAL, WARNING and SMALL based on the abnormality information, and when FATAL is discriminated, the robot 1 is immediately stopped by implementing stable state transition control.

When WARNING is discriminated, control is continued until completion of the walking step of the robot 1 in progress, and when SMALL is discriminated, the only measure taken is to inform the operator, and control of the robot 1 is continued.

The aforesaid three degrees (ranks) are established only for error detection with regard to the distributed ECUs and only one degree is established for other errors. That is to say, when error is discriminated for the inclination sensor 60, FATAL is the only discrimination made, in which case the action taken is to use the output of the sub-gyro instead of the main gyro and to implement stable state transition control for immediately stopping the robot 1.

When error is discriminated for the six-axis force sensor 58, FATAL is again the only discrimination made, in which case the action taken is to use the sensor theoretical value and to implement stable state transition control for immediately stopping the robot 1.

When error is discriminated for the power system (battery 64), WARNING is the only discrimination made, in which case the control up to that point is continued until completion of the walking of the robot 1 in progress. The same also applies to the wireless system, voice recognition system and image recognition system. In other words, control is continued until completion of the operation because there is little likelihood of the robot 1 tipping over in such instances. It is noted, however, that is possible in such a case to effect control for immediately stopping the robot 1 if there is no output during a predetermined time period of, say, 1 minute.

As explained in the foregoing, this embodiment is configured to self-diagnose whether the quantity of state of the robot 1 is an abnormal value, or whether at least one of the internal sensor such as the inclination sensor 60 and the electric motor 10R(L), etc., is abnormal and when an abnormality is self-diagnosed, the abnormality information is outputted, then the degree (rank) of abnormality is discriminated based on the outputted abnormality information and the robot 1 is driven into a stable state in response to the discriminated degree of abnormality, it becomes possible to effectively utilize the abnormality detection result. In addition, since the robot is driven into a stable state in response to the discriminated degree of abnormality, it becomes possible to make the driving appropriate.

Further, since it is configured such that the robot is driven into a stable state in response to the discriminated degree of abnormality based on a predetermined action plan chart, in addition to the effects and advantages mentioned above, it becomes possible to render the driving into a stable state more appropriately.

Further, since it is configured such that the degree (rank) of abnormality and a parameter indicative of the quantity of state of the robot 1 (posture parameters) are stored in the internal memory 68g and in the external memory 94, it becomes possible to ascertain accurately the course of events leading up to the abnormality, thereby enabling to further improve the reliability of abnormality detection of the mobile robot. Further, it becomes possible to drive the robot into a stable state by taking the quantity of state into account, thereby enabling the driving into a stable state more appropriately.

In addition, since it is configured to self-diagnose that the quantity of state is an abnormal value when the error θerr of the quantity of state of the robot 1 relative to the dynamic model exceeds a predetermined value at the time of effecting the macroscopic stabilization control, it is possible to improve the reliability of abnormality detection since the quantity of state abnormality can be accurately detected, thereby enabling to render the driving into a stable state more appropriately.

As stated above, this embodiment is configured to have a system for detecting abnormality of a mobile robot having at least a drive motor (electric motor 10R(L), etc.), an internal sensor that senses a quantity of state of the internal of the robot and a control unit (main ECU 68) constituted by an onboard microcomputer that operates the drive motor (electric motor) based on the quantity of state obtained from an output of the internal sensor to move, specifically a system for detecting abnormality of a mobile robot having at least a body 3 and a plurality of (more specifically two) leg linkages 2 each swingably connected to the body through a joint and each connected with a foot 22 at its distal end through a joint a drive motor (electric motor 10R(L), etc.), an internal sensor that senses a quantity of state of the internal of the robot and a control unit (main ECU 68) constituted by an onboard microcomputer that operates (or drives) the drive motor (electric motor) based on the quantity of state obtained from an output of the internal sensor to move, the control unit comprising: self-diagnosis means (main ECU 68, distributed ECUs 70 to 86, S10, S34, S36, S100, S200, S300) for self-diagnosing whether the quantity of state is an abnormal value, or whether at least one of onboard equipments mounted on the robot including at least the drive motor (electric motor) and the internal sensor is abnormal; abnormality information outputting means (main ECU 68, S18) for outputting, when an abnormality is self-diagnosed by the self-diagnosis means, information of the abnormality; abnormality degree discriminating means (main ECU 68, S20) for inputting the output of the abnormality information outputting means and for discriminating degree of abnormality (the rank of error) based on the abnormality information; and stable state driving means (main ECU 68, S24) for driving the robot into a stable state in response to the discriminated degree of abnormality.

Further, it is configured such that, in the system, the stable state driving means drives the robot into a stable state in response to the discriminated degree of abnormality (the rank of error, more specifically FATAL, WARNING and SMALL) based on a predetermined action plan chart.

Further, it is configured such that, the system further including: abnormality degree storing means (main ECU 68, S30, S32) for storing the discriminated degree of abnormality in an internal memory (internal flash memory 68g) provided in the control unit and in an external memory 94a provided outside the robot.

Further, it is configured such that, in the system, the abnormality degree storing means (main ECU 68, S30, S32) stores the output of the abnormality degree discriminating means and a parameter indicative of the quantity of state of the robot (posture parameters), in an internal memory provided in the control unit and in an external memory provided outside the robot.

Further, it is configured such that, in the system, the control unit includes: dynamic model behavior correcting means (macroscopic stabilization control calculator 68b) for inputting at least a desired manipulated variable and based on a dynamic model which outputs a desired behavior of the robot, that is a plant, such that the desired manipulated variable is satisfied, correcting the behavior of the dynamic model, by additionally inputting a correction amount of the desired manipulated variable determined in response to an error in the quantities of state of the dynamic model and the robot to at least the dynamic model; and control means for controlling operation of the drive motor (electric motor) so as to follow the behavior of the dynamic model, more specifically joint displacement control means (macroscopic stabilization control calculator 68b) for driving the drive motor (electric motor) to conduct displacement control of the joints; and the self-diagnosis means (main ECU 68, S10) self-diagnoses that the quantity of state is an abnormal value when the error in the quantities of state of the dynamic model and the robot, more specifically the error $\theta err$ of the inclination (angle) is not within a predetermined value.

Further, it is configured such that, in the system, the robot has a body 3 and a plurality of leg linkages 2 each swingably connected to the body through a joint and each connected with a foot at its distal end through a joint, the internal sensor includes an inclination sensor 69 that generates an output indicative of an inclination of the body 3 of the robot relative to a vertical axis, and the self-diagnosis means (distributed ECU 70, S34, S100) self-diagnoses that the inclination sensor is abnormal when the output of the inclination sensor is not within a predetermined range.

Further, it is configured such that, in the system, the robot has a body 3 and a plurality of leg linkages 2 each swingably connected to the body through a joint and each connected with a foot at its distal end through a joint; the internal sensor includes an angle detector (rotary encoder 56) that generates an output indicative of at least one of an angle, angular velocity and angular acceleration of the joints, and the self-diagnosis means (distributed ECU 70, S34, S100) self-diagnoses that the angle detector is abnormal when the output of the angle detector is not within a predetermined range.

Further, it is configured such that, in the system, the onboard equipments includes an external sensor (vision sensor 50) that generates an output indicative of taken images.

Further, it is configured such that, in the system, the onboard equipments includes a floor reaction force detector (six-axis force sensor 58) that detects a floor reaction force acting on the robot, and the self-diagnosis means (distributed ECU 82, S34, S100) self-diagnoses that the floor reaction force detector is abnormal when the output of the floor reaction force detector is not within a predetermined range.

Further, it is configured such that, in the system, the onboard equipments include sensors (current sensor 102, temperature sensor 104) that detect a current supplied to the drive motor (electric motor) and a temperature of the drive motor, and the self-diagnosis means (distributed ECUs 70 to 80, S34, S100) self-diagnoses that the drive motor (electric motor) is abnormal when at least one of the detected current and temperature is not within a corresponding one of predetermined ranges set respectively with respect to the current and temperature.

Further, it is configured such that, in the system, the onboard equipments includes a battery 64 that supplies a current to the control unit and the drive motor (electric motor) and a voltage sensor 90 that generates an output indicative of a voltage of the battery, and the self-diagnosis means (distributed ECU 84, S34, S100) self-diagnoses that the battery is abnormal when the output of the voltage sensor is smaller than a predetermined value.

Further, it is configured such that, in the system, the onboard equipments include a voice recognition system (voice input/output device 52, etc.) that enables voice communication with an operator.

Further, it is configured such that, the system further includes: an operator's operation control unit (operator ECU 94) provided outside the robot and comprising a microcomputer that includes the external memory; and communication means (communication unit 96) connecting the control unit and the operator's operation control unit for establishing communication therebetween; and the self-diagnosis means (distributed ECU 86, S36, S200) self-diagnoses whether the communication means is abnormal.

Although it has been set out in the foregoing that, in abnormality detection for the drive motors (electric motors), internal sensors and the like, abnormality is detected by comparing the outputs with predetermined values, in other words with fixed values, it can instead be performed by providing a table or map. For instance, taking the power system (battery 64) as an example for the purpose of explanation, it is possible to tabulate or map the expected battery voltage as a function of the workload estimated from the time period and expected locomotion and define the predetermined value by retrieval from the table or map.

With regard to the six-axis force sensors 58, it is possible, for example, to tabulate or map the expected time-course change in floor reaction force acting on the robot 1 as a function of the distance of travel, time and the like of the expected locomotion and define the predetermined value by retrieval from the table or map.

Although the explanation has been made taking a humanoid legged mobile robot as an example of a mobile robot, this invention is not limited this but is similarly appropriate for application to a wheel or crawler type mobile robot and also similarly appropriate for application to a legged mobile robot equipped with three or more leg linkages.

Although the explanation has been made taking an electric motor as an example of a drive motor, this invention is not limited to this but a hydraulic motor, pneumatic motor or other such fluid pressure motor or the like is also similarly appropriate.

INDUSTRIAL APPLICABILITY

According to this invention, in an abnormality detection system of a mobile robot, since it is configured such that it is self-diagnosed whether the quantity of state is an abnormal value, or whether at least one of the internal sensor, etc., is abnormal and when an abnormality is self-diagnosed, abnormality information is outputted, then the degree of abnormality is discriminated based on the outputted abnormality information and the robot is driven into a stable state in response to the discriminated degree of abnormality, it becomes possible to effectively utilize the abnormality detection result. In addition, since the robot is driven into a stable state in response to the discriminated degree of abnormality, it becomes possible to render the driving appropriate. Therefore, this invention can be applied to an abnormality detection system of a mobile robot.

The invention claimed is:

1. A system for detecting abnormality of a mobile robot having at least a drive motor, an internal sensor that senses a quantity of state of the internal of the robot and a control unit constituted by an onboard microcomputer that operates the drive motor based on the quantity of state obtained from an output of the internal sensor to move, the control unit comprising:
   a. self-diagnosis means for self-diagnosing whether the quantity of state is an abnormal value, or whether at least one of onboard equipments mounted on the robot including at least the drive motor and the internal sensor is abnormal;
   b. abnormality information outputting means for outputting, when an abnormality is self-diagnosed by the self-diagnosis means, information of the abnormality;
   c. abnormality degree discriminating means for inputting the output of the abnormality information outputting means and for discriminating degree of abnormality in accordance with ranks defined in advance including stopping of locomotion of the robot based on the abnormality information; and
   d. stable state controlling means for controlling the robot into a stable state in response to the discriminated degree of abnormality based on a predetermined action plan chart, wherein the stable state controlling means is configured to perform a plurality of actions and wherein the stable state controlling means, when controlling of the robot into the stable state, selects one or more of said a plurality of actions depending on the discriminated degree of abnormality.

2. The system according to claim 1, further including:
   e. abnormality degree storing means for storing the discriminated degree of abnormality in an internal memory provided in the control unit and in an external memory provided outside the robot.

3. The system according to claim 2, wherein the abnormality degree storing means stores the output of the abnormality degree discriminating means and a parameter indicative of the quantity of state of the robot, in an internal memory provided in the control unit and in an external memory provided outside the robot.

4. The system according to claim 1, wherein the control unit includes:
   f. dynamic model behavior correcting means for inputting at least a desired manipulated variable, and based on a dynamic model which outputs a desired behavior of the robot, that is a plant, such that the desired manipulated variable is satisfied, correcting the behavior of the dynamic model, by additionally inputting a correction amount of the desired manipulated variable determined in response to an error in the quantities of state of the dynamic model and the robot to at least the dynamic model; and
   g. control means for controlling operation of the drive motor so as to follow the behavior of the dynamic model;
   and the self-diagnosis means self-diagnoses that the quantity of state is an abnormal value when the error in the quantities of state of the dynamic model and the robot is not within a predetermined value.

5. The system according to claim 1, wherein the robot has a body and a plurality of leg linkages each swingably connected to the body through a joint and each connected with a foot at its distal end through a joint, the internal sensor includes an inclination sensor that generates an output indicative of an inclination of the body of the robot relative to a vertical axis, and the self-diagnosis means self-diagnoses that the inclination sensor is abnormal when the output of the inclination sensor is not within a predetermined range.

6. The system according to claim 1, wherein the robot has a body and a plurality of leg linkages each swingably connected to the body through a joint and each connected with a foot at its distal end through a joint; the internal sensor includes an angle detector that generates an output indicative of at least one of an angle, angular velocity and angular acceleration of the joints, and the self-diagnosis means self-diagnoses that the angle detector is abnormal when the output of the angle detector is not within a predetermined range.

7. The system according to claim 1, wherein the onboard equipments include an external sensor that generates an output indicative of taken images.

8. The system according to claim 1, wherein the onboard equipments include a floor reaction force detector that detects a floor reaction force acting on the robot, and the self-diagnosis means self-diagnoses that the floor reaction force detector is abnormal when the output of the floor reaction force detector is not within a predetermined range.

9. The system according to claim 1, wherein the onboard equipments include sensors that detect a current supplied to the drive motor and a temperature of the drive motor, and the self-diagnosis means self-diagnoses that the drive motor is abnormal when at least one of the detected current and temperature is not within a corresponding one of predetermined ranges set respectively with respect to the current and temperature.

10. The system according to claim 1, wherein the onboard equipments include a battery that supplies a current to the control unit and the drive motor and a voltage sensor that generates an output indicative of a voltage of the battery, and the self-diagnosis means self-diagnoses that the battery is abnormal when the output of the voltage sensor is smaller than a predetermined value.

11. The system according to claim 1, wherein the onboard equipments include a voice recognition system that enables voice communication with an operator.

12. The system according to claim 1, further including:
   h. an operator's operation control unit provided outside the robot and comprising a microcomputer that includes the external memory; and
   i. communication means connecting the control unit and the operator's operation control unit for establishing communication therebetween;
   and the self-diagnosis means self-diagnoses whether the communication means is abnormal.

13. A system for detecting abnormality of a mobile robot having at least a drive motor, an internal sensor that senses a quantity of state of the internal of the robot and a control unit constituted by an onboard microcomputer that operates the drive motor based on the quantity of state obtained from an output of the internal sensor to move, the control unit comprising:
   a. self-diagnosis means for self-diagnosing whether the quantity of state is an abnormal value, or whether at least one of onboard equipments mounted on the robot including at least the drive motor and the internal sensor is abnormal;
   b. abnormality information outputting means for outputting, when an abnormality is self-diagnosed by the self-diagnosis means, information of the abnormality;
   c. abnormality degree discriminating means for inputting the output of the abnormality information outputting means and for discriminating degree of abnormality based on the abnormality information;

d. stable state driving means for driving the robot into a stable state in response to the discriminated degree of abnormality;

e. dynamic model behavior correcting means for inputting at least a desired manipulated variable, and based on a dynamic model which outputs a desired behavior of the robot, that is a plant, such that the desired manipulated variable is satisfied, correcting the behavior of the dynamic model, by additionally inputting a correction amount of the desired manipulated variable determined in response to an error in the quantities of state of the dynamic model and the robot to at least the dynamic model; and f. control means for controlling operation of the drive motor so as to follow the behavior of the dynamic model, wherein the self-diagnosis means self-diagnoses that the quantity of state is an abnormal value when the error in the quantities of state of the dynamic model and the robot is not within a predetermined value.

* * * * *